United States Patent [19]
Luckman et al.
[11] 4,429,365
[45] Jan. 31, 1984

[54] SPARK TIMING CONTROL SYSTEM

[75] Inventors: James E. Luckman, Anderson; John L. Kastura, Kokomo; Thomas L. Voreis, Windfall, all of Ind.

[73] Assignee: General Motors Corporation, Detroit, Mich.

[21] Appl. No.: 291,614

[22] Filed: Aug. 10, 1981

[51] Int. Cl.[3] .......................... G05B 15/00; F02P 5/00
[52] U.S. Cl. .......................... 364/431.08; 364/431.03; 364/431.04; 123/414; 123/417
[58] Field of Search .............. 364/569, 431.08, 431.04, 364/431.03; 123/414, 416, 417, 612, 613

[56] References Cited

U.S. PATENT DOCUMENTS 3,830,207 8/1974 Joseph ................................ 123/416
3,943,898 3/1976 Kiencke .............................. 123/416
4,231,091 10/1980 Motz .................................. 364/431
4,262,644 4/1981 Walker et al. .................. 123/416 X
4,355,360 10/1982 Asano et al. ..................... 123/417 X
4,360,874 11/1982 Ohba et al. ...................... 123/417 X

*Primary Examiner*—Gareth D. Shaw
*Assistant Examiner*—Ronni S. Malamud
*Attorney, Agent, or Firm*—Albert F. Duke

[57] ABSTRACT

A spark timing control system for an uneven firing engine utilizes a microprogrammed engine controller which produces a spark timing control system based on internal calculations using spark advance and dwell variables supplied by a microcomputer. A crankshaft position transducer produces a reference signal having alternate long and short pulses from which the firing cycle may be determined. The microcomputer is interrupted at each falling edge of the reference signal and based on a determination of the existing firing cycle, calculates and supplies appropriate spark advance and dwell numbers to the controller.

6 Claims, 5 Drawing Figures

SPARK TIMING CONTROL SYSTEM

This invention relates to electronic spark timing control systems and, more particularly, to a system capable of controlling the spark timing of an uneven firing engine.

An uneven firing engine is one in which crankshaft angular displacement between successive piston top dead center (TDC) positions is irregular or uneven. For example, in an uneven firing V-6 engine, successive TDC positions may alternate between 108° and 132° of crankshaft rotation whereas in an even firing V-6 engine, successive piston TDC positions are separated by a constant 120° of crankshaft rotation.

A system which is particularly effective in controlling the spark timing of an even firing engine is disclosed in U.S. Pat. No. 4,231,091 which is assigned to the assignee of the present invention. That system includes a microprogrammed engine controller which supplies an ignition circuit with a variable pulse width, variable position spark timing control (ESTC) signal. The controller raises and lowers the ESTC signal based on internal calculation using spark advance and dwell variables supplied by a microcomputer which periodically computes such variables based on engine operating parameters. A real time clock in the engine controller includes a free running counter which is continuously clocked from a 64 KHz, signal. The dwell number supplied by the microcomputer specifies the number of counts of the counter that the ESTC signal is to remain high. The spark advance number supplied by the microcomputer specifies the number of counts of the counter between the falling edge of the ESTC output and a crankshaft reference pulse edge. It is desirable that the reference pulse edges occur at a constant crankshaft angular interval so that the time interval between successive edges is a measure of RPM. The dwell and spark advance numbers for producing a correct ESTC signal for an even firing engine will therefore produce an erroneous ESTC signal for an uneven firing engine because the regularly spaced reference pulse edges will not occur at a fixed crankshaft angular displacement from the irregularly spaced piston top dead center positions.

With the foregoing in mind, it is an object of the present invention to provide a spark timing control system for an engine having long and short firing cycles including a crankshaft position transducer producing a reference signal and computer means responsive to the reference signal for determining, from a characteristic of the reference signal, the firing cycle of the engine in order to provide spark advance information applicable to the particular firing cycle.

It is another object of the present invention to provide a spark timing control system for an uneven firing engine which includes a microcomputer which responds to a real time interrupt to compute a spark advance number and a dwell number as a function of engine operating parameters and in response to a second interrupt from a crankshaft position transducer, determines from the duty cycle of the transducer signal whether the interrupt occurred during a long or short firing cycle of the engine in order to modify the numbers as necessary to compensate for irregularity in firing cycle.

Other objects and advantages of the present invention will be apparent from the following detailed description which should be read in conjunction with the drawings in which.

Figure 1:
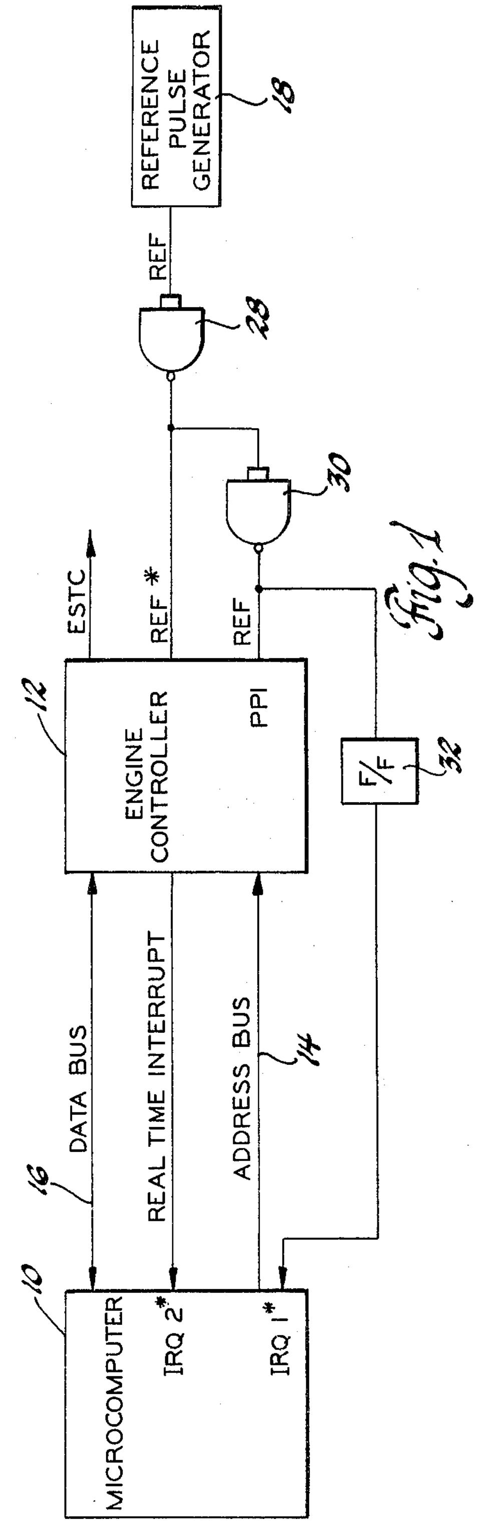
FIG. 1 is a block diagram of the present invention.

Referring now to the drawings and initially to FIG. 1, the system comprises a microcomputer generally designated 10 which may include a plurality of interconnected separate chips containing memories, CPU and I/O or a single chip microcomputer such as the Motorola MC6801. An engine controller generally designated 12 is interconnected with the microcomputer 10 over an address bus 14 and a data bus 16. The controller 12 contains a simple ALU, prioritized control logic including a ROM containing a microprogram, and a plurality of 16 bit RAM registers, addressable by a microcomputer 10, for holding information and intermediate calculations. Execution of the microprogram is initiated by priority vector latches which respond to external and internal inputs. The microprogram within the controller 12 uses a 1 MHz. system clock for instruction execution. This system clock is divided down to 64 KHz. and is used to drive a 16 bit free-running counter. This counter, hereinafter referred to as the B counter, is used as a time base in the controller. The controller 12 is described in greater detail in U.S. Pat. No. 4,231,091. Alternatively, the functions of the controller 12 may be implemented with a second single chip microcomputer such as the Motorola MC6801.

Every 12.5 milliseconds, the controller 12 generates a real time interrupt to the microcomputer 10 at the input IRQ2* as shown in FIG. 1. In response to the real time interrupt, microcomputer 10 computes spark advance in degrees and computes dwell in milliseconds. Spark advance is based primarily on RPM and manifold pressure measurements, however, corrections to the basic spark advance angle for coolant temperature and altitude variations may also be included. Dwell is a function of RPM. The spark advance and dwell numbers are stored in RAM of the microcomputer 10 for future use. The controller 12 uses spark advance and dwell information supplied by the microcomputer 10, the output of a reference pulse generator 18, and internal calculations to determine when to raise and lower an output signal designated ESTC. The ESTC output signal is a variable pulse width, variable position signal and is supplied to the usual ignition circuit which develops the high voltage distributed to the spark plugs.

Figure 2:
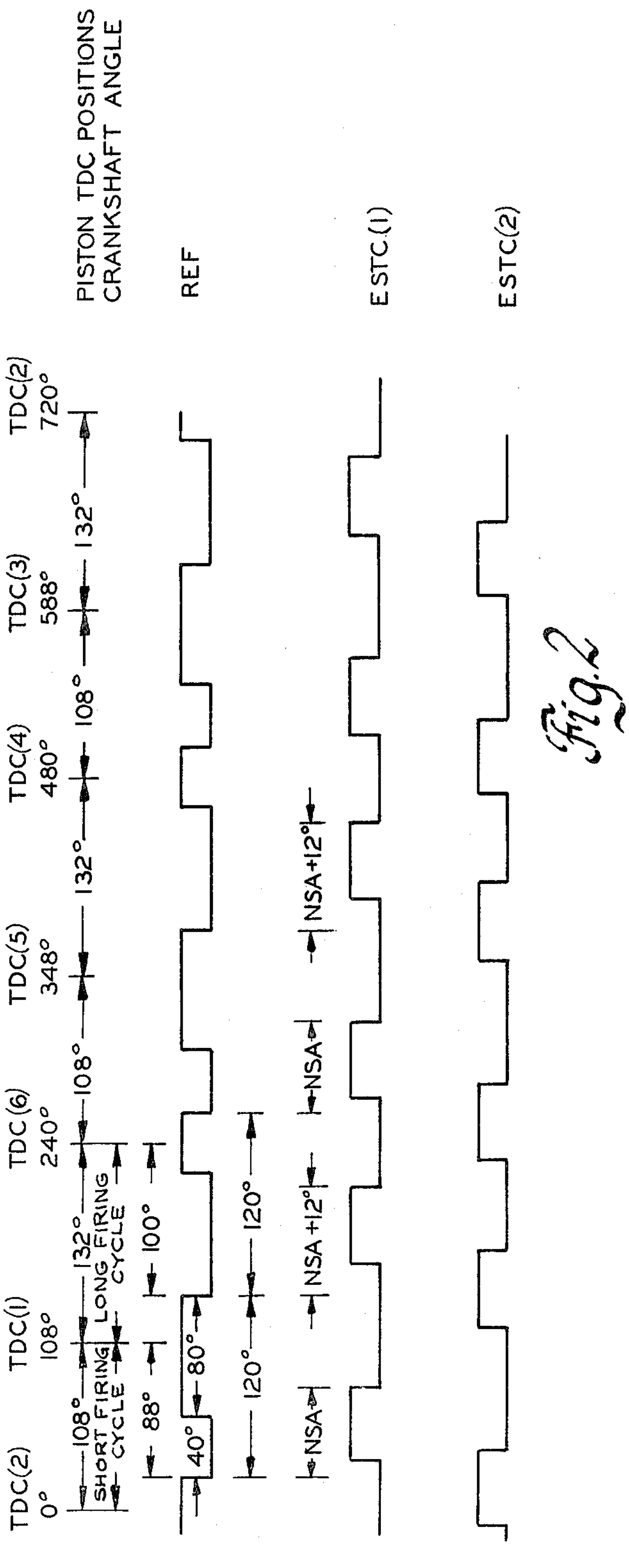
FIG. 2 is a typical ESTC output of the engine controller and its relationship to the crankshaft position transducer output signal and piston top dead center for an uneven firing engine.
Figure 3:
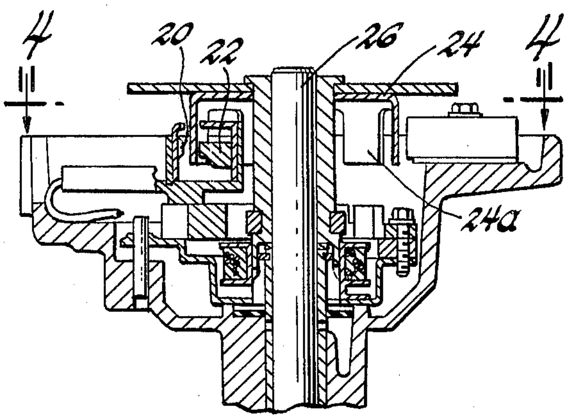
FIGS. 3 and 4 are sectional views of the crankshaft position transducer of the present invention.
Figure 4:
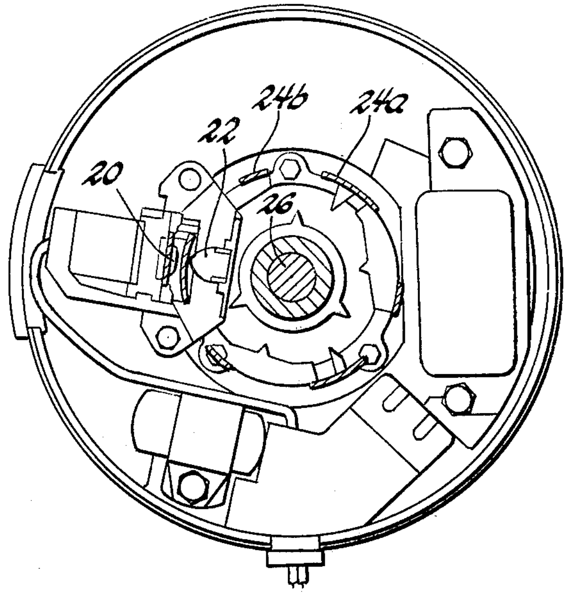

The reference pulse generator 18 generates a signal designated REF in response to crankshaft rotation. A suitable generator is shown in FIGS. 3 and 4 and includes a hall effect sensor 20 which is placed in a stationary magnetic field supplied by magnet 22. A cylindrical ferrous shunting element 24 attached to the distributor shaft 26 is configured with alternate wide and narrow projections 24*a* and 24*b* respectively which when aligned between the magnet 22 and the sensor 20 reduces the strength of the magnetic field causing the voltage developed across the hall sensor 20 to drop thus producing the alternate wide and narrow pulses in the REF waveform shown in FIG. 2.

The REF signal is input to the controller 12 through an inverter 28. In response to each falling edge of REF (rising edge of REF*), the controller 12 through its microprogram executes the following set of equations:

$$FALREF = BCTR - NEXR + FALREF \quad (1)$$

$$RISREF = BCTR - NEXR + RISREF \quad (2)$$

$$REFPER = BCTR - REFTIM \quad (3)$$

$$NEXR = REFPER + BCTR \quad (4)$$

$$REFTIM = BCTR \quad (5)$$

The values for the variables, FALREF, RISREF, REFPER, NEXR and REFTIM are stored in separate RAM registers of the controller 12. Such registers are hereinafter also referred to by such designations. The variables FALREF and RISREF are the value of the B counter when the ESTC output should next fall and rise respectively. The variable NEXR is a predicted B counter value when the next falling edge of REF should occur assuming a constant engine speed. The variable REFTIM is the value of the B counter when the falling edge of REF last occurred. The variable BCTR is the value of the B counter upon the occurrence of a falling edge of REF. REFPER is the number of B counter counts between falling edges of REF. Thus, on a falling edge of REF, the value of FALREF and RISREF are corrected in equations (1) and (2) for a difference between predicted and actual B counter values (BCTR−NEXR) at the falling edge of REF. Subsequently, the period of the REF signal is computed (Equation 3), the time of occurrence of the next REF falling edge is predicted (Equation 4) and the time of occurrence of the present falling edge of REF is stored (Equation 5).

As explained in more detail in the aforementioned patent, when the ESTC output signal is low, the controller 12 performs a search for rise routine which involves a comparison between the B counter and the variable designated RISREF. The controller raises the ESTC output signal when the B counter value is equal to or greater than RISREF. Conversely, when the ESTC output signal is high, a search for fall routihne is carried out which lowers the ESTC signal whenever the B counter is equal to or greater than the variable FALREF. These routines are initiated at a 32 KHz. rate.

The variable FALREF is computed by the controller 12 when the ESTC signal rises and is represented by the following equation:

$$FALREF = OLDFAL + REFTIM \quad (6)$$

where OLDFAL is the spark advance (ESTFAL) supplied during the last update by the microcomputer 10. This computed value of FALREF is increased by REFPER if necessary until equal to or greater than the B counter. The variable RISREF is computed by the controller 12 when the ESTC signal falls and is represented by the following equation:

$$RISREF = FALREF + REFPER - ESTDWELL \quad (7)$$

where ESTDWELL is the dwell number supplied during the last update by the microcomputer 10.

In an even firing engine, where piston top dead center occurs at a constant crankshaft angle from the falling edge REF, it is sufficient, as in the aforementioned patent application, to update the controller 12 every 12.5 milliseconds because the spark advance and dwell numbers are valid regardless of the firing cycle. However, as shown in FIG. 2, the piston top dead center positions of an uneven firing engine are not evenly spaced. For example, successive piston TDC positions may be separated by 108° and 132° of crankshaft rotation. In this case, the falling edges of REF are not equally spaced from successive piston TDC positions. Instead, for the example shown, the falling edges of REF alternate between positions of 88° and 100° before piston TDC position. Therefore, in order for the ESTC signal to be raised and lowered at the proper time relative to piston TDC, it is necessary that the spark advance and dwell numbers supplied by the microcomputer 10 take into account whether the engine is in a long (132°) or short (108°) firing cycle. In order to accomplish this, the microcomputer 10 is supplied with information sufficient to make a determination of the firing cycle of the engine. The falling edge of REF occurs at 88° before TDC when the engine is in a short firing cycle and 100° before TDC when the engine is in a long firing cycle. The duty cycle of the REF signal permits a determination of whether a falling edge of REF occurred during a short or long firing cycle. With the waveform REF aligned relative to piston TDC as shown in FIG. 2, when the REF signal is low for 40° and then high for 80°, for a duty cycle of 67%, the falling edge occurs during the long firing cycle period. On the other hand, if the REF signal is low for 80° and then high for 40° for a duty cycle of 33%, the falling edge occurs during the short firing cycle. As previously indicated, the falling edges of the REF signal (rising edge of REF*) are logged by the controller 12 as REFTIM. The B counter value at the rising edges of REF is logged by a routine in the controller 12 responding to the REF signal at the input PP1 which implements the following equation:

$$PP1TIM = BCTR \quad (8)$$

Figure 5:
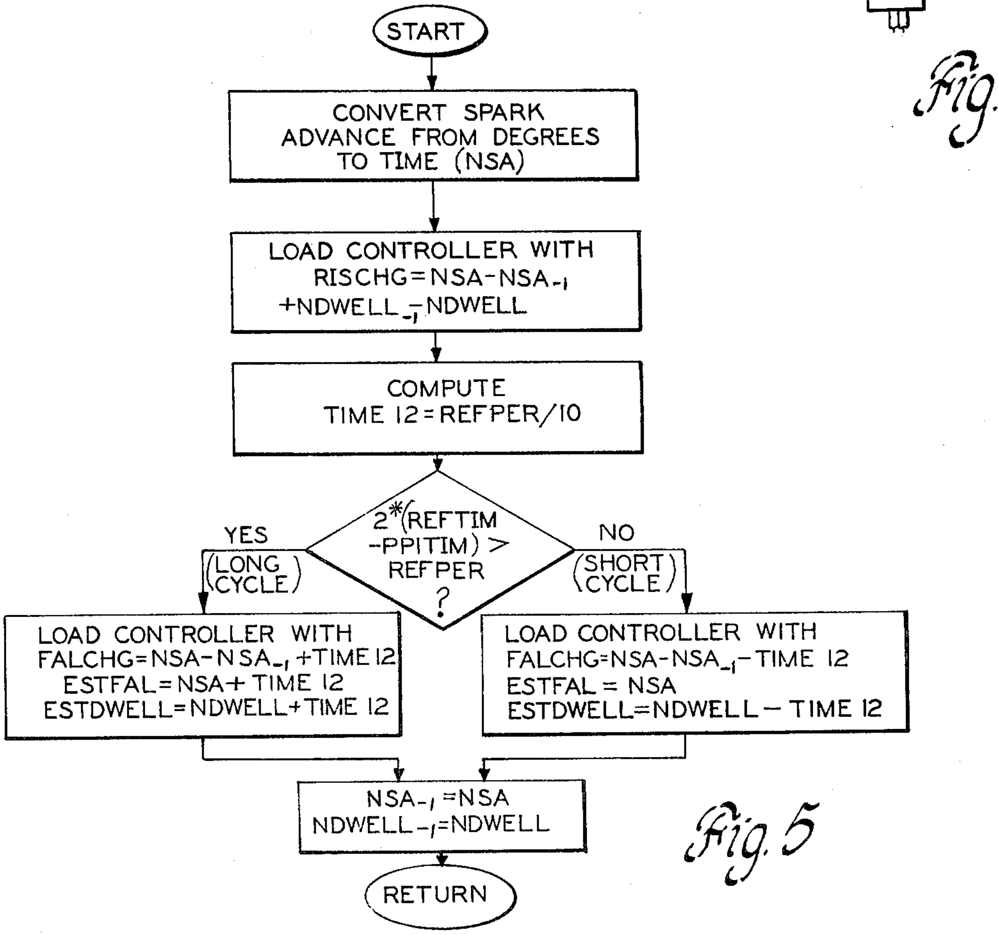
FIG. 5 is a simplified flowchart of the spark timing program for obtaining spark advance and dwell numbers.

This input is obtained from the reference generator 18 through the inverter 28 and 30. The difference between REFTIM and PP1TIM represent the high time for REF and the determination of whether 2×(REFTIM−PP1TIM) is greater than REFPER, will identify whether the falling edge occurred during the short or long firing cycle. The REF signal is applied to an edge triggered flip-flop 32 which is connected to the interrupt input IRQ1* in the microcomputer 10 so that the microcomputer 10 receives an interrupt request on each falling edge of the REF signal. A simplified flowchart of the service routine initiated in response to this interrupt is shown in FIG. 5. During this routine, the spark advance angle, computed during the real time interrupt is converted to a time base and referenced to the falling edge of the REF signal. In other words, the spark advance is converted to the number of 64 KHz. counts of the B counter which should occur from the falling edge of REF to the falling edge of the ESTC output signal. In this particular embodiment of the invention, it is assumed that the falling edge of REF signal occurred at 88° before top dead center, for this calculation. This time based spark advance number, designated NSA, is the normal spark advance for the 108° firing cycle of the uneven firing engine. However, during the 132° firing cycle, the falling edge of REF occurs 100° before TDC and therefore the NSA value must be modified for the long firing cycle.

The dwell number is equal to the number of counts of the B counter that the ESTC signal should remain high. This number is stored in a location in RAM of microcomputer 10 designated NDWELL. The present and previous values of the NSA and NDWELL numbers are utilized to calculate a variable designated RISCHG, which is computed in accordance with the formula shown in FIG. 5 and loaded to a location in the RAM of controller 12. The RISCHG variable is the difference between the present spark advance (NSA) and the previous spark advance ($NSA_{-1}$) minus any difference between the present dwell (NDWELL) and the previous dwell ($NDWELL_{-1}$). If the ESTC signal is low at the time of the update, the controller 12 uses the variable RISCHG to adjust the rising edge of the ESTC signal to compensate for changes in spark advance and dwell since the previous update by the microcomputer 10. After RISCHG is calculated and loaded to the controller 12, the microcomputer 10 computes a variable designated TIME12 which represents the time for 12° of crankshaft rotation. It will be recalled that REFPER is equal to the time between falling edges of the REF signal which are separated by 120° of crankshaft rotation. Thus, TIME12 is equal to REFPER/10. The variable TIME12 is used to adjust the values of FALCHG, ESTFAL and ESTDWELL to be supplied to the controller 12 as necessary to compensate for the 12° crankshaft angle difference in the location of the falling edge of REF and piston top dead center position on successive cycles. The next step in the service routine as shown in FIG. 5, is the determination of whether the interrupt occurred during the long or short cycle. This determination is made on the basis of the duty cycle of the REF signal, i.e., the ratio of the on to off time of the REF signal since the previous interrupt. The on time of the REF signal is equal to REFTIM−PP1TIM. If twice the on time is greater than REFPER, then the interrupt occurred during the long cycle and if not, the interrupt occurred during the short cycle. The controller 12 is then loaded with the values for FALCHG, ESTFAL and ESTDWELL as defined in FIG. 5, depending upon whether the interrupt occurred during the long or short cycle. After updating the controller 12, the spark advance number NSA is stored in a RAM location $NSA_{-1}$ and the dwell number NDWELL is stored in a RAM location $NDWELL_{-1}$.

The reasoning behind the FALCHG, ESTFAL and ESTDWELL definition in FIG. 5 will be understood from the following discussion relative to FIG. 2. If the ESTC signal is high when the microcomputer 10 loads the spark advance number (ESTFAL) to the controller 12, the FALREF and OLDFAL numbers are updated by the controller 12 in accordance with the following equations:

$$FALREF=FALREF+FALCHG \quad (9)$$

$$OLDFAL=ESTFAL \quad (10)$$

If the ESTC signal is low at the time the microcomputer 10 loads ESTFAL to the controller 12, the RISREF and OLDFAL numbers are updated by the controller 12 in accordance with the following equations:

$$RISREF=RISREF+RISCHG \quad (11)$$

$$OLDFAL=ESTFAL \quad (12)$$

If the ESTC signal is low when the controller 12 is updated (ESTC (1) in FIG. 2), the FALCHG data is ignored by the controller 12. If the engine is in the short firing cycle, ESTFAL is the normal spark advance number NSA. If the engine is in the long firing cycle, ESTFAL is NSA+TIME12 to compensate for the fact that the next piston TDC position is 12° of crankshaft rotation later than expected when the NSA calculations were made. The NSA calculation had assumed that the interrupt would occur 88° before TDC.

Dwell time should be the same without regard to whether the engine is in a long or short firing cycle. The rising edge of ESTC is controlled by the RISREF number which is computed on the falling edge of the ESTC signal. The number which is loaded into ESTDWELL controls the dwell time in the next cycle in accordance with equation (7). During a short cycle, TIME12 is subtracted from NDWELL to form ESTDWELL so that RISREF will be delayed by 12° in the upcoming long cycle. Since FALREF is also delayed 12° in the long cycle, the ESTC high time will equal NDWELL. During a long cycle, the FALREF value used in computing RISREF (for the upcoming short cycle) is 12° larger than normal. In order for RISREF to occur NDWELL before FALREF in the upcoming short cycle thereby keeping the ESTC high time equal to NDWELL, TIME12 is added to NDWELL to form ESTDWELL.

If the ESTC signal is high when the controller 12 is updated (ESTC (2) in FIG. 2), the ESTFAL data supplied during this update will not be used in determining the next ESTC fall. Instead, the FALREF number, which was computed when ESTC rose will be used, and this number is not applicable to the present firing cycle because FALREF was computed using ESTFAL data loaded into the controller 12 at the previous update (NSA+TIME12) and therefore applicable to the previous firing cycle. The controller 12 is programmed to correct FALREF for changes between previous and present spark advance numbers ($NSA-NSA_{-1}$) using the FALCHG variable supplied by the microcomputer 10, this FALCHG variable may be used to correct this problem. If the engine is in a short cycle update, FALREF was computed using OLDFAL data from the long cycle update which was:

$$OLDFAL=ESTFAL=NSA+TIME12$$

By subtracting TIME12 from ($NSA-NSA_{-1}$) to form FALCHG, the value for FALREF computed by the controller 12 will equal NSA which is the correct value for the short cycle. If the engine is in the long cycle update, FALREF was computed using OLDFAL data from the short cycle update which was:

$$OLDFAL=ESTFAL=NSA$$

In order to correct the FALREF value, ($NSA-NSA_{-1}$) is increased by TIME12 to form FALCHG.

The various values shown in FIG. 2 are by way of example only. The relative positioning of the falling edge of REF to piston TDC position should be such that the falling edge of REF falls outside the allowable range of the firing event and in advance of the firing event by enough time to allow the microcomputer 10 to correct the position of the falling edge of ESTC. For example, if the firing event may occur from piston TDC position to 70° in advance of TDC position for the short cycle and 500 microseconds (18° at 6000 rpm) is required to service the interrupt, then 88° before TDC is a desirable position for the falling edge of REF during the short cycle.

The embodiments of the invention in which an exclusive property or privilege is claimed are defined as follows:

1. A spark timing control system for an uneven firing engine having alternate long and short firing cycles in which successive piston top dead center positions are separated by relatively long and relatively short angular intervals of crankshaft rotation respectively, said system comprising crankshaft position transducer means for producing a reference signal having a first characteristic which occurs at regular crankshaft angle positions and a second characteristic identifying whether the first characteristic occurred during said long or short firing cycle, computer means for periodically developing a spark advance number referenced to the occurrence of said first characteristic and applicable to one of said firing cycles, means responsive to said first characteristic of said reference signal for generating an interrupt, said computer means, in response to said interrupt, determining if said interrupt occurred in said one of said cycles based on said second characteristic of said reference signal and following such determination, modifying said spark advance number if said interrupt occurred in the other of said cycles to compensate for the difference in the displacement of successive piston top dead center positions from the crankshaft angle position where said first characteristic occurs, and engine controller means responsive to said reference signal for generating a spark timing output signal based on said spark advance number.

2. The system defined in claim 1 wherein said reference signal contains alternate long and short pulses and wherein said first characteristic is the falling edge of said pulses and said second characteristic is the width of said pulses.

3. A spark timing control system for an uneven firing engine in which piston top dead center positions define alternate relatively long and short angular intervals of crankshaft rotation, said system comprising crankshaft position transducer means for producing a pulsating reference signal having an edge which occurs at regular crankshaft angular intervals and a duty cycle identifying whether said edge occurred during said long or short angular interval, said edge occurring once and only once during each long or short angular interval, computer means responsive to at least one engine operating condition for developing a firing number applicable to one of said short or long intervals, said firing number specifying the time interval between an engine firing event and the occurrence of said edge, means responsive to said edge of said reference signal for generating an interrupt, said computer means, in response to said interrupt, determining whether said interrupt occurred during said long or short angular interval based on said duty cycle and following such determination, modifying said firing number if the interrupt occurred during the other of said short or long intervals to compensate for the difference in the displacement of successive piston top dead center positions from the crankshaft angle position where said edge occurs, and engine controller means responsive to said reference signal for generating a spark timing output signal based on said firing number.

4. A spark timing control system for an uneven firing engine in which successive piston top dead center positions occur at alternate relatively long and short angular intervals of crankshaft rotation, said system comprising crankshaft position transducer means for producing a pulsating reference signal having a pulse edge which occurs at regular crankshaft angular intervals once and only once during each of said long and short intervals, computer means responsive to at least one engine operating condition for developing a dwell number specifying how long an ignition coil should be energized and a firing number specifying the time interval between an engine firing event and the occurrence of said pulse edge, means responsive to said pulse edges of said reference signal for generating an interrupt, said computer means, in response to said interrupt, determining whether said interrupt occurred during said short or long angular interval and adjusting said dwell and/or firing numbers to compensate for the difference in the displacement of successive piston top dead center positions from said pulse edge of said reference signal, and engine controller means for generating a spark timing control signal based on said dwell and firing numbers and the time of occurrence of said pulse edge.

5. A spark timing control system for an uneven firing engine in which successive piston top dead center positions occur at alternate relatively long and short angular intervals of crankshaft rotation, said system comprising a crankshaft position transducer producing a pulsating reference signal containing alternate long and short pulses, said pulses having falling edges which occur in said long and short angular intervals respectively, said falling edges being separated by a fixed crankshaft angle, said long and short pulses being respectively greater than and less than one-half said fixed crankshaft angle, computer means responsive to a real time interrupt for developing a dwell number specifying how long a spark timing signal should remain high and a firing number specifying the time interval between piston top dead center and the falling edge of said spark timing signal, means responsive to the falling edge of each pulse in said reference signal for generating a second interrupt, said computer means, in response to said second interrupt, comparing the time interval of the pulse with the period of the reference signal to determine whether said interrupt occurred during said short or long interval and adjusting said dwell and/or firing numbers for the irregularity in the displacement of successive piston top dead center positions from the falling edge of said reference signal, engine controller means including clock means providing a time reference, said controller means adapted to generate said real time interrupt, said controller means further adapted to store the time of occurrence of the rising and falling edges of said reference signal, and calculate and store the period of said reference signal, said controller means adapted to generate said spark timing signal based on said adjusted dwell and/or firing numbers and the time of occurrence of said falling edges.

6. The system defined in claim 5 wherein said long interval is 132° of crankshaft rotation, said short interval is 108° of crankshaft rotation, the falling edges of said reference signal are separated by 120° of crankshaft rotation, said long and short pulses are respectively 80° and 40° of crankshaft rotation.

* * * * *